Feb. 10, 1925. 1,526,063
J. T. GRIFFIN ET AL
METHOD OF AND APPARATUS FOR REMOVING THE INSULATION FROM
ELECTRICAL CONDUCTORS
Filed Dec. 16, 1920 3 Sheets-Sheet 1
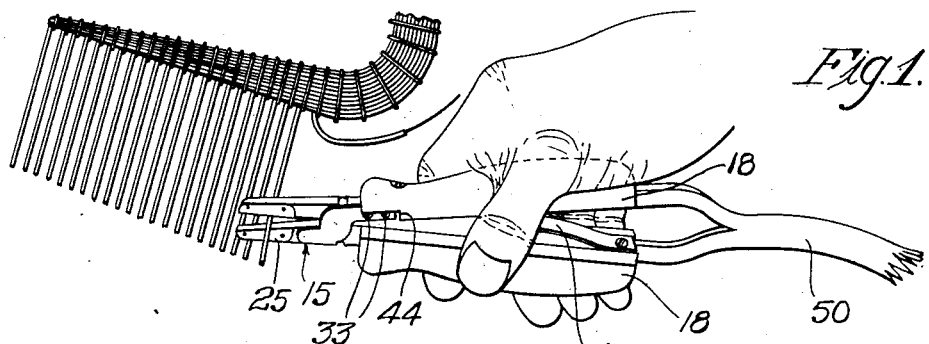
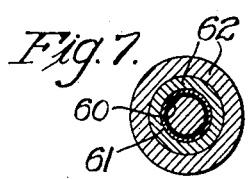
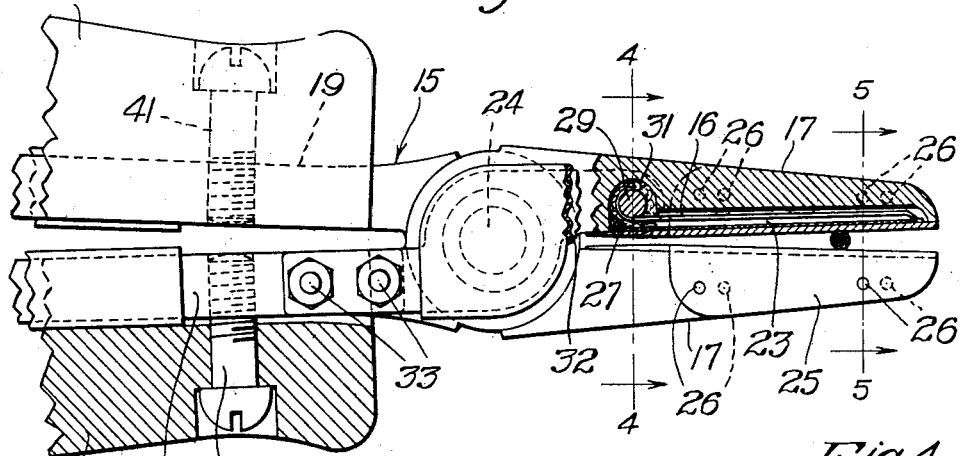
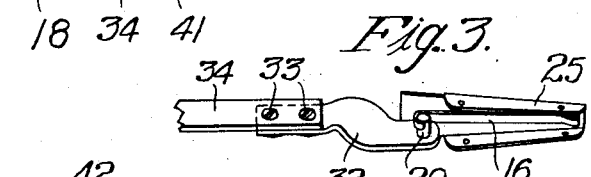
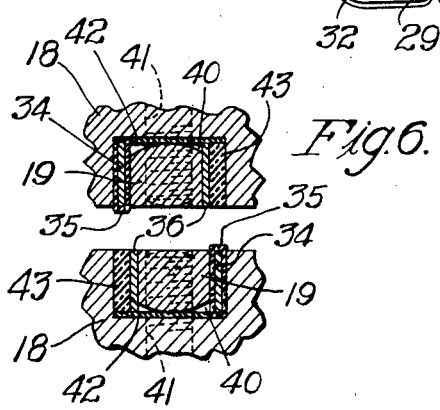
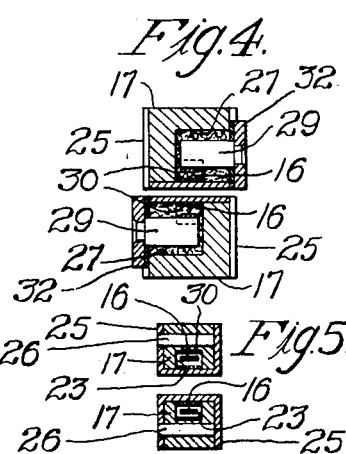
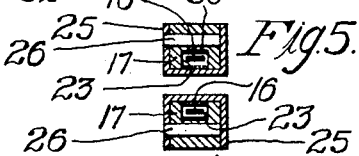
Inventors
James T. Griffin
William A. Timm
by J. W. Campbell
Atty.

Feb. 10, 1925.
1,526,063
J. T. GRIFFIN ET AL
METHOD OF AND APPARATUS FOR REMOVING THE INSULATION FROM
ELECTRICAL CONDUCTORS
Filed Dec. 16, 1920
3 Sheets-Sheet 2

Inventors
James T. Griffin
William A. Timm
by G. M. Campbell
Atty.

Feb. 10, 1925. 1,526,063
J. T. GRIFFIN ET AL
METHOD OF AND APPARATUS FOR REMOVING THE INSULATION FROM
ELECTRICAL CONDUCTORS
Filed Dec. 16, 1920. 3 Sheets-Sheet 3

Inventors
James T. Griffin
William A. Timm
by G.M. Campbell
Atty.

Patented Feb. 10, 1925.

1,526,063

UNITED STATES PATENT OFFICE.

JAMES T. GRIFFIN, OF OAK PARK, AND WILLIAM A. TIMM, OF BERWYN, ILLINOIS, ASSIGNORS TO WESTERN ELECTRIC COMPANY, INCORPORATED, OF NEW YORK, N. Y., A CORPORATION OF NEW YORK.

METHOD OF AND APPARATUS FOR REMOVING THE INSULATION FROM ELECTRICAL CONDUCTORS.

Application filed December 16, 1920. Serial No. 431,189.

*To all whom it may concern:*

Be it known that we, JAMES T. GRIFFIN and WILLIAM A. TIMM, citizens of the United States, residing at Oak Park and Berwyn, respectively, in the county of Cook and State of Illinois, have invented certain new and useful Improvements in Methods of and Apparatus for Removing the Insulation from Electrical Conductors, of which the following is a full, clear, concise, and exact description.

This invention relates to an improved method of and apparatus for removing the insulation from electrical conductors, and more particularly to conductors which are coated with an insulating compound and covered with a textile covering.

It is one of the objects of this invention to provide an efficient method of and convenient apparatus for rapidly removing the textile coverings and the insulating compound from the conductor in a single operation without removing or harming a tin coating which may be applied thereto and without burning or charring the textile coverings.

The steps of a method employed in the practice of this invention consist essentially in severing by pressure the textile coverings, applying heat to the insulating compound to cause a flow of it, and stripping the severed portions of textile coverings and the softened compound from the conductor. The stripping operation is in a direction longitudinally of the conductor.

A convenient apparatus for practicing the above method and embodying features of this invention comprises a pair of oppositely disposed pivotal jaws of sufficient hardness and strength to sever the textile covering when pressure is applied and equipped with heating means for raising the jaws to a temperature sufficient to soften the insulating compound.

As a further feature of this invention, means are provided for mounting the heating elements in the jaws in such a manner that they may be readily removed for replacement and repairs.

Another object of this invention relates to a compact and convenient form of portable container for the skinning tool and its associated apparatus whereby the apparatus may be connected directly with a commercial circuit by the mere insertion of the plug and all adjustable and replaceable parts will be readily accessible for operation and maintenance.

A form of container suitable for this purpose is one in which a compartment is provided for enclosing a transformer which is connected by leads to the apparatus and to a connecting plug, the skinning apparatus and plug with their leads being coiled in a shallow portion in the top of the container when not in use. Compartments provided in the front of the container and covered by a convenient door contain a regulating switch and fuses respectively. The compartment containing the fuses may also have a screw plug adapted for use in the socket of a commercial circuit.

In the drawings:

Fig. 1 is a perspective view of the electrically heated skinning tool shown as used in the method of preparing the wires of switchboard cables for soldering to the terminals;

Fig. 2 is an enlarged side view partly in section of the jaw end of the tool;

Fig. 3 is a perspective view showing the assembly of the jaw covering member with the heating element and the conductor connection;

Fig. 4 is a vertical section taken on the line 4—4 of Fig. 2;

Fig. 5 is a vertical section taken on the line 5—5 of Fig. 2;

Fig. 6 is a partial end view looking toward the right of Fig. 2;

Fig. 7 is a cross section of one type of insulated wire which is adapted to have the insulation removed therefrom by the method and apparatus of this invention;

Figure 8:
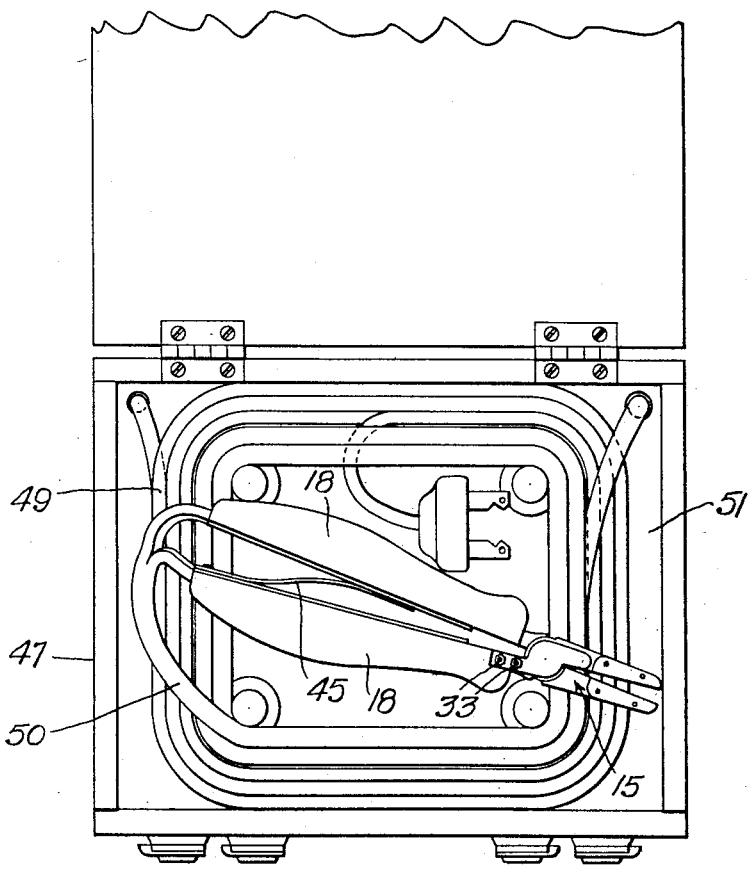
Fig. 8 is a plan view of the transformer and tool container with the cover thereof partly broken away.
Figure 9:
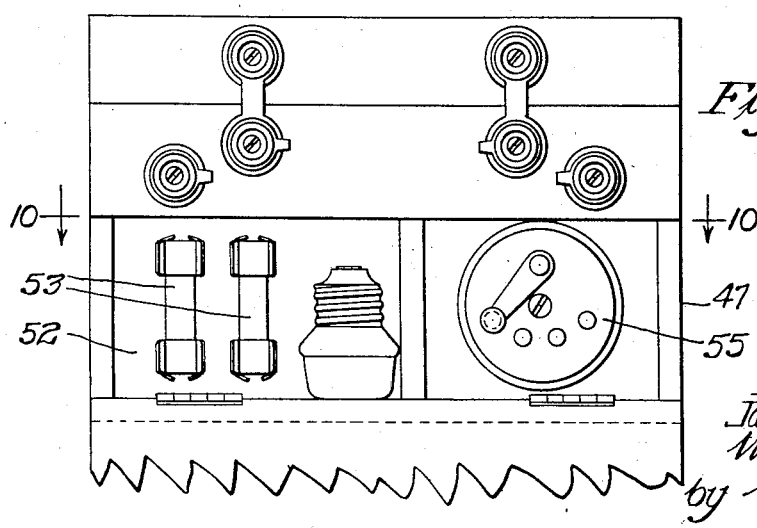
Fig. 9 is a front view thereof with the switch and fuse compartment uncovered and the cover therefor partly broken away.
Figure 10:
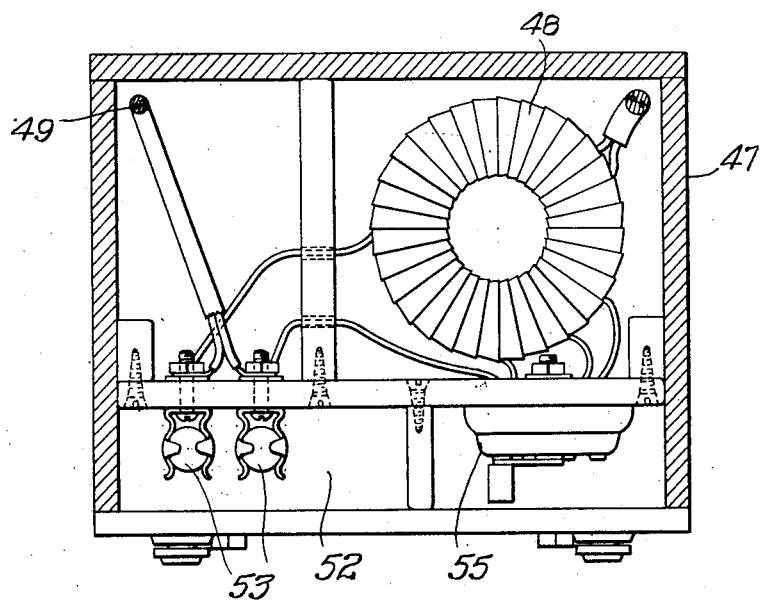
Fig. 10 is a plan section taken on the line 10—10 of Fig. 9.

As shown in the drawings, 15 represents a pair of ordinary flat nosed pliers of standard make mainly modified to enclose a heating element 16 in the form of a resistance ribbon placed in each jaw 17 thereof and preferably equipped with wooden handles 18 suitably secured to metal handle portions 19 of the pliers 15. A shallow channel 23 formed in the gripping face of each jaw 17, best shown in Figs. 2 and 5, extends a short distance from the end thereof to a point near the pivotal connection 24 of the jaws and encloses the heating element 16. A U-shaped square-cornered metallic cover member 25 surrounds three sides of each jaw 17 including the gripping face, thereby forming a closure for the channel 23 and extending along the sides of the jaw for approximately three-quarters of its length. Pins 26, 26 suitably spaced and secured to the sides of the jaw 17 enter suitable openings in the cover member 25 to hold it in place and still allow for its removal when necessary, as will be explained further on in the description. In modifying the pliers 15 for use in this invention the gripping faces of the jaws 17 are cut down to the thickness of the material forming the cover member 25 so that the jaws 17 will have a suitable gripping and severing effect on the wire conductors placed therebetween in the use of this invention. At its inside end the channel 23 is enlarged, as indicated at 27, to extend toward one side with the direction of enlargement reversed in each jaw 17. The enlargement 27 in the channel 23 is semi-cylindrical in shape and extends deeper into the jaw than the main channel. Projecting into the enlargement 27 is a connector and supporting pin 29 to which is brazed one end of the heating element 16. The other end of the heating element is adapted to be secured, preferably by brazing, to the cover 25 with the length between the two connecting points spaced from contact with the jaw 17 and the cover 25. Suitable layers 30 of insulation, preferably mica, the width of the channel 23, are secured to the inside face of the cover 25 which encloses the channel 23 and to the surface of the channel 23 above the heating element 16 to provide against the cover 25, making contact with the heating element in case undue manipulation of the pliers should force the cover 25 into the channel 23, or if the heating element should become bowed enough to make contact with the surface above the channel 23. The space around the pin 29 between it and the enlargement 27 in the channel 23 is filled with a suitable insulation, preferably asbestos string, as indicated at 31. The pin 29 is secured to a conductor plate 32 which is shaped to follow the shape of the jaw member 17 from the jaw portion of the offset handle portion 19 where it is secured by bolts 33 to a conductor strip 34 which is positioned along one side of the handle portion 19 of the pliers and suitably insulated therefrom by a layer of tape as indicated at 35. The conductor plate 32 is spaced from contact with the jaw 17 about its central portion by a wrapping of some suitable insulation such as tape, indicated at 35. One side of the circuit is suitably connected to the conductor strip 34 with the other side thereof connected direct to the handle portion 19 by a conductor strip 36 suitably secured, preferably by brazing, to the opposite side thereof. The wooden handle members 18 are channeled out as indicated at 40, best shown in Fig. 6, and within them the handle portion 19 of the pliers with the conductor strips 34 and 36 are secured by means of screws 41 suitably positioned along and threaded into the handle portion 19. Layers 42 and 43 of suitable insulation are secured within the channel 40 to insulate the metal handle portion 19 and the conductor strip 36 from the wooden handle 18. The wooden handles 18 are notched or cut away as indicated at 44 to expose the ends of the bolts 33 whereby the nuts thereof may be removed to allow for the removal of the conductor plate 32. A leaf spring 45 is positioned between the handles 19, being suitably secured to one handle and resting against the other, thereby tending to force the jaws 17 apart.

To facilitate a quick repair of the skinning tool in case the heating element burns out or should not function properly the conductor plate 32 with the pin 29 which has secured to it one end of the heating element 16, the other end of which is secured to the cover member 25, are all adapted to be removed from the jaw as one unit and quickly replaced with a new one. When this change is necessary the nuts are first removed from the bolts 33 and the plate 32 free therefrom. The sides of the cover 25 are now pried from the sides of the jaws a sufficient distance to clear the pins 26 secured thereto, after which by turning the unit with the pin 29 as its axis within the enlarged portion 27 of the channel 23 in a direction to clear the top edge of the sides of the cover 25 from the inside surface of the jaw and then moving it sideways to free the pin 29 from the enlargement 27 of the channel 23, the unit may be removed and in the reverse order a new unit substituted.

This feature of the quick removal and replacement of the heating element with its supports provides for a very efficient tool, particularly as the change can be made in a shorter time than a new heating element could be brazed to the pin 29 and the cover 25 in a repair shop and it very frequently happens that a suitable repair shop is not convenient.

A case 47 is provided for housing a small transformer 48 the primary winding of which is designed to be connected by a conductor 49 equipped to be connected to a 55 or 110 volt alternating current circuit. The transformer 48 delivers a high amperage, low voltage current for heating the heating element 16. The conductor 49 and a conductor 50 of suitable length which connects the secondary of the transformer with the skinning tool are all housed within an upper compartment 51 of the case 47. Within a compartment 52 located below the compartment 51 and at one side of the case are suitable fuses 53 which are connected in the line between the source of current and the primary side of the transformer to protect it in case the conductor 49 should be plugged in on a direct current line or in case of a short circuit in the skinning tool. A switch 55 for regulating the voltage delivered to the secondary is connected to the primary side of the transformer and is conveniently mounted in the compartment 52.

Figure 11:
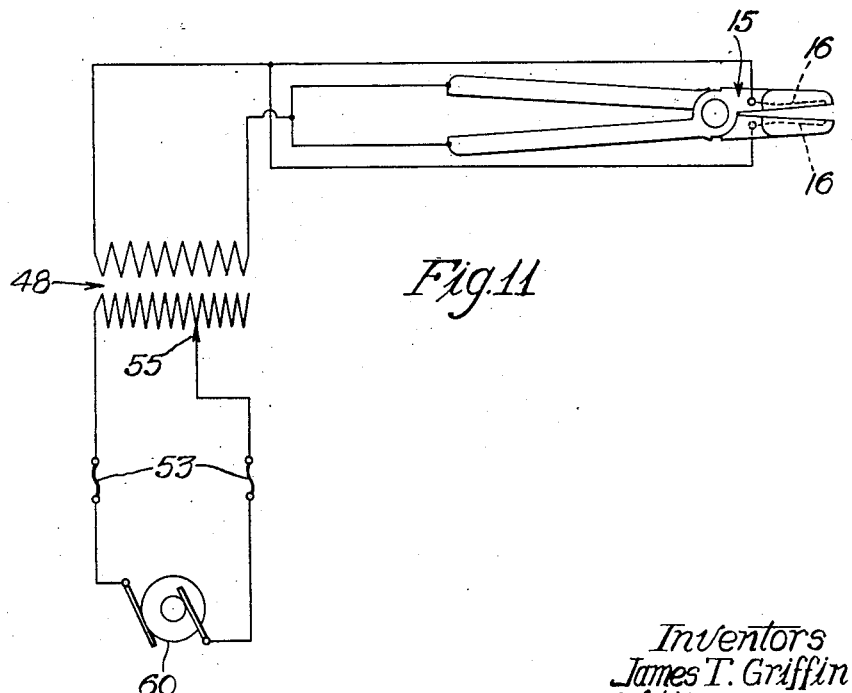
Fig. 11 is an electrical circuit for the skinning tool with the tool shown diagrammatically.

In the electrical circuit illustrated in Fig. 11, 60 denotes an alternating current generator connected to the primary side of the transformer 48 with the fuses 53 connected in the lines therebetween. The switch 55 for regulating the voltage delivered to the secondary of the transformer is illustrated in the conventional way. The heating elements 16 are connected in parallel to the secondary side of the transformer as illustrated.

In the use of this tool, an example of which is illustrated in Fig. 1, as applied to skinning the ends of the wires of switchboard cables preparatory to being soldered to terminals, the wires (see Fig. 7) are of copper with first a coating of tin 60, then a coating of black enamel 61, and then two servings of textile insulation 62 applied thereto.

In using the tool the gripping surfaces of the jaws 17 are first brought to a suitable temperature by regulating the switch 55, and then the operator, as illustrated, grips the conductor between the jaws 17 and applies a suitable pressure to sever the coverings and at the same time melt the insulating compound coating by action of the heated surfaces of the jaws. In applying the pressure there will be a give or very slight drop of the jaws at the completion of the severing which will notify the operator of the giving away of the textile. Upon the above notification the operator will quickly release the pressure a trifle and immediately apply a movement sideways on the tool toward the end of the conductor. This last movement will cause the severed covering to move off the wire with the insulating compound melting, due to the heated gripping surfaces of the jaws. The severing of the covering is so quick that the textile coverings are not burned or charred by the heat of the gripping surfaces of the jaws, but this heat is sufficient to melt the insulating compound coating which causes it to be taken off without harming the tinned surface of the wire.

The temperature of the heating elements may be so regulated that the jaws will not be sufficiently hot to burn or char the textile covering but will be raised to a sufficiently high temperature to melt or flow the insulating compound.

What is claimed is:

1. The method of removing the insulation from conductors coated with an insulating compound and covered with a textile covering, which consists in applying pressure and heat to sever the textile covering and melt the insulating compound and removing the insulation by a stripping action.

2. The method of removing the insulation from conductors coated with an insulating compound and covered with a textile covering, which consists in applying pressure to sever the textile covering and heat to melt the insulating compound and finally removing the insulation from the conductor by a relative longitudinal movement of the conductor and the insulation.

3. The method of removing insulation from conductors coated with an insulating compound and covered with a textile covering which consists in the simultaneous application of heat and pressure to the insulation to sever the continuity of the textile covering and melt the insulating compound and finally stripping the severed portion of textile and the melted portion of the compound from the conductor by moving it longitudinally thereof.

4. The method of removing insulation from the ends of conductors coated with an insulating compound and covered with a textile covering, which consists in applying pressure to the covering to sever it and simultaneously applying heat at the point under pressure to melt the insulating compound, and finally skinning the severed coverings including the melted insulating compound from the wire in one operation.

5. The method of removing insulation from the ends of conductors coated with an insulating compound and covered with a textile covering, which consists in applying pressure to the covering to sever it and simultaneously applying heat along the surface under pressure to melt the insulating compound, and finally by a continued pressure and a movement of the severed covering in a direction longitudinally of the wire skinning the severed coverings including the melted insulating compound from the wire in one operation.

6. A hand operated tool for stripping insulation material from conductors, comprising a pair of oppositely disposed jaw members and heating means associated with said jaw members.

7. A hand operated tool for stripping insulation material from conductors, comprising a pair of oppositely disposed jaw members, heating means associated with each of said jaw members and carried thereby.

8. A hand operated tool for stripping insulation material from conductors, comprising a pair of oppositely disposed jaws provided in their gripping face with a chamber, an exchangeable and replaceable electrical heating unit for each jaw supported within the chamber, and means for supplying current to said heating units to heat said jaws.

9. A hand operated tool for stripping insulation material from conductors, a pair of oppositely disposed pivotal jaws, a resistor associated with each of said jaws, and means for supplying current to said resistors to heat said jaws.

10. A hand operated tool for stripping insulating material from conductors, a pair of oppositely disposed pivoted jaws, an electrically operated heating element associated with each of said jaws, handle members for operating the jaws, and electrical connections for said heating elements supported by the handle members.

11. A hand operated tool for stripping insulating material from conductors, a pair of oppositely disposed pivotal jaws, an electrically operated heating element removably mounted on each of said jaws, and handle members for operating said jaws.

12. An apparatus comprising oppositely disposed, pivoted, and heated jaws for simultaneously removing in a single operation a textile covering and an insulating compound coating from a coated and textile covered conductor.

13. An apparatus for removing an insulating compound coating and a textile covering from a coated and textile covered conductor comprising compressible, heated members for severing the textile covering and melting the coating of insulating compound.

14. In an apparatus for stripping an insulating compound and a textile covering from conductors coated with a compound and covered with a textile covering, a pair of compressible jaws adapted to sever the textile covering, and heating elements applied to said jaws for maintaining them at a temperature to melt the insulating compound.

15. A hand tool for skinning textile coverings and insulating compound coatings from the ends of coated and textile covered conductors, comprising compressible jaw members adapted upon operation to compress the covering to sever it, and means for heating said jaw members for simultaneously causing the insulating compound coating to melt.

16. A hand tool for skinning textile coverings and insulating compound coatings from the ends of coated and textile covered conductors, comprising compressible flat faced gripping jaws adapted upon operation to compress the covering to sever it, and electric heating means associated therewith for simultaneously causing the insulating compound coating to melt.

17. A hand tool for skinning textile coverings and insulating compound coatings from the ends of coated and textile covered conductors, comprising pivoted gripping jaws adapted upon operation to compress the covering to sever it, and electric heating means associated therewith for simultaneously causing the insulating compound coating to melt.

18. A hand tool for skinning textile coverings and insulating compound coatings from the ends of coated and textile covered conductors, comprising compressible flat faced jaw members adapted upon operation to compress the covering causing it to be severed, an electric heating element within each jaw member for simultaneously melting the insulating compound coating, and electric circuit connections for said electric heating elements carried on said jaw members.

19. A hand tool for skinning textile coverings and insulating compound coatings from the ends of coated and textile covered conductors, comprising compressible flat faced gripping jaws each provided with a chamber for housing an electric heating element comprising a resistance ribbon, said jaw members adapted upon operation to compress the covering causing it to be severed while simultaneously the heat radiated from said resistance ribbon melts the insulating compound coating, and electric circuit connections for said resistance ribbon carried on said jaw members.

20. An electrically heated hand tool for skinning textile coverings and insulating compound coatings from the ends of insulated conductors, compressible gripping jaws provided in their gripping face with a chamber, handles for said jaws, an exchangeable and replaceable electric heating unit for each jaw comprising a resistance ribbon adapted to be supported within the chamber, a cover member for the chamber adapted to form the gripping face of the jaw and to support one end of said resistance ribbon, a circuit connecting and supporting member for the other end of said resistance ribbon mounted on each of said handles, means for mounting said cover members on said jaws and said circuit connecting and supporting members on said handles to support said resistance ribbons in position whereby they may be readily removed and replaced, said jaws adapted upon operation to compress the covering causing it to be severed while simultaneously the heat radiated from said resistance ribbon melts the insulating compound coating, and electric circuit connections for said circuit connecting members carried on said handles.

21. A portable wire stripping apparatus comprising a heated stripping tool, a transformer, circuit controlling apparatus, and circuit connections between said stripping tool, transformer and circuit controlling apparatus.

22. A portable wire stripping apparatus comprising an electrically heated hand stripping tool, a transformer, protective apparatus, circuit controlling apparatus, and electrical connections between said stripping tool, transformer, protective apparatus and circuit controlling apparatus.

In witness whereof, we hereunto subscribe our names this 6th day of December A. D., 1920.

JAMES T. GRIFFIN.
WILLIAM A. TIMM.